(12) United States Patent
Staniulis, Jr.

(10) Patent No.: US 11,260,565 B1
(45) Date of Patent: Mar. 1, 2022

(54) METHOD OF MAKING A MONOLITHIC AIR TRANSFER APPARATUS

(71) Applicant: Anthony Staniulis, Jr., Las Vegas, NV (US)

(72) Inventor: Anthony Staniulis, Jr., Las Vegas, NV (US)

( * ) Notice: Subject to any disclaimer, the term of this patent is extended or adjusted under 35 U.S.C. 154(b) by 0 days.

(21) Appl. No.: 17/322,910

(22) Filed: May 18, 2021

(51) Int. Cl.
| | |
|---|---|
| *B29C 49/00* | (2006.01) |
| *B29C 45/00* | (2006.01) |
| *F28C 1/14* | (2006.01) |
| *F28C 1/00* | (2006.01) |
| *B29K 23/00* | (2006.01) |
| *B29L 31/18* | (2006.01) |

(52) U.S. Cl.
CPC ............ *B29C 45/0001* (2013.01); *F28C 1/14* (2013.01); *B29K 2023/065* (2013.01); *B29L 2031/18* (2013.01); *F28C 2001/006* (2013.01)

(58) Field of Classification Search
CPC ............ B29C 45/0001; B29C 49/0005; B29K 2023/065; B29L 2031/18; F28C 1/14; F28C 2001/006
USPC .................................................. 264/478, 454
See application file for complete search history.

(56) References Cited

U.S. PATENT DOCUMENTS

| | | | |
|---|---|---|---|
| 2,810,478 A | 10/1957 | Sejournet et al. | |
| 3,213,662 A | 10/1965 | Lenz | |
| 3,739,556 A * | 6/1973 | Waters | F28C 1/02 96/356 |
| 4,746,479 A * | 5/1988 | Hanaki | B28B 3/269 264/629 |
| 6,863,941 B2 * | 3/2005 | Detounay | B60K 15/03177 220/562 |
| 6,931,883 B2 * | 8/2005 | Bourne | F24F 5/0035 62/314 |
| 8,468,846 B2 * | 6/2013 | Vaidyanathan | F28F 21/065 62/304 |
| 10,583,535 B2 * | 3/2020 | Caimano | B29C 64/153 |
| 10,900,679 B1 * | 1/2021 | Staniulis, Jr. | F28F 25/04 |

(Continued)

FOREIGN PATENT DOCUMENTS

EP  0 162 117 A1 * 11/1985

OTHER PUBLICATIONS

Mikell Knights, Water Injection Molding Makes Hollow Parts Faster, Lighter, Retrieved from: https://www.ptonline.com/articles/water-injection-molding-makes-hollow-parts-faster-lighter, 2004.

(Continued)

*Primary Examiner* — Charles S Bushey
(74) *Attorney, Agent, or Firm* — Bayramoglu Law Offices LLC

(57) ABSTRACT

An air transfer apparatus being made as a monolithic or an integral structure or enclosure. The monolithic air transfer apparatus or enclosure is made from a non-porous material and is made from any of the manufacturing methods of molding, injection molding, blow molding or extruding. The monolithic air transfer apparatus or enclosure can be any of a cooling tower, a swamp cooler or a cooling Indirect Direct Evaporative Cooler. The monolithic air transfer apparatus has at least one integral cavity manufactured therein and at least one heat exchanger pad can be attached to the monolithic air transfer apparatus or made integral with the monolithic air transfer apparatus.

12 Claims, 8 Drawing Sheets

(56) References Cited

U.S. PATENT DOCUMENTS

| | | | |
|---|---|---|---|
| 10,900,724 B1* | 1/2021 | Staniulis, Jr. | F28F 27/003 |
| 11,073,335 B1* | 7/2021 | Staniulis, Jr. | F28C 1/14 |
| 2005/0001334 A1* | 1/2005 | Roberts | F24F 13/20 |
| | | | 261/36.1 |
| 2008/0223771 A1* | 9/2008 | Schuster | B01F 1/0027 |
| | | | 210/167.11 |
| 2015/0037525 A1* | 2/2015 | Maeda | B29C 45/0046 |
| | | | 428/36.92 |
| 2015/0258721 A1* | 9/2015 | Berg, Jr. | B29C 33/38 |
| | | | 425/144 |
| 2017/0241655 A1* | 8/2017 | LePoudre | F28D 15/00 |
| 2018/0299167 A1* | 10/2018 | Miles | B29C 44/5681 |
| 2020/0284526 A1* | 9/2020 | Desgrosseilliers | F28D 20/021 |
| 2021/0300218 A1* | 9/2021 | Greenwood | B60N 2/5642 |

OTHER PUBLICATIONS

Michael Hansen, Gas-Assist Molding: Notjust for hollow parts, Retrieved from: https://www.machinedesign.com/materials/article/21832463/gasassist-molding-not-just-for-hollow-parts, 2001.

Blow Molding Design Guide: Understanding Blow Molding, Retrieved from: https://geminigroup.net/wp-content/uploads/2018/06/Blow-Molding-Design-Guide-by-Regency-Plastics.pdf, 2018.

Injection molding of hollow components, Retrieved from: https://cordis.europa.eu/project/id/BRPR980671, 1998.

Mikell Knights, Retrieved from: https://www.ptonline.com/articles/water-injection-molding-it's-all-coming-together, 2005.

Water-Assisted Injection Molding, Retrieved from: https://www.upminc.com/services/water-injection/, 2021.

\* cited by examiner

Injection Molding Machine

Blow Molding Machine

METHOD OF MAKING A MONOLITHIC AIR TRANSFER APPARATUS

TECHNICAL FIELD

The present disclosure relates to a method of making a monolithic air transfer apparatus or enclosure to which a heat exchanger, such as an evaporative heat exchanger, can be attached and/or adapted thereto. The air transfer apparatus or enclosure can and may be any one of a cooling tower, a swamp cooler or a cooling Indirect Direct Evaporative Cooler (IDEC). The air transfer apparatus or enclosure is manufactured from a non-porous material and/or comprising a non-porous material and from any of the manufacturing methods of molding, injection molding, blow molding, extruding or any other equivalent method.

BACKGROUND

Evaporative coolers provide cool air by converting hot dry air through an evaporative process. This evaporative process works by forcing warm air through fluidly moist heat exchange pads to remove the hot dry air's heat. A supply air stream which is cooled enters into a desired space. A more specific type of evaporative cooling process is a two-stage indirect-direct evaporative cooling system, which offers good cooling effectiveness and expands the regions of the world where evaporative cooling can be used.

Direct evaporative cooling cools air by evaporating water which increases the moisture content of the air. One goal of a direct evaporative cooling system is to have the supply air temperature leaving the evaporative cooler approach the outdoor wet-bulb temperature. Direct evaporative cooling systems are suitable for hot and dry climates where the design wet-bulb temperature is 68° F. or lower. In other climates, outdoor humidity levels are too high to allow for sufficient cooling.

Indirect evaporative cooling uses a heat exchanger to remove heat from a supply air stream without adding moisture.

When indirect cooling is combined with direct evaporative cooling, the supply air is cooled and additionally some moisture is added to the supply air. This combination of indirect cooling and direct evaporative cooling is known as a two-stage system which is referred to in the art and in the industry as indirect-direct or indirect-direct evaporative cooler/cooling (IDEC) systems and can meet the cooling load for industrial and commercial buildings in arid to semi-arid climates. IDEC systems provide cooler supply air at a lower relative humidity than direct evaporative cooling units. First, the indirect stage cools the supply air without increasing humidity. Since the air is cooled, the air has a reduced capacity to hold moisture. Next, the supply air is then passed through a direct cooling stage, which cools the air further while adding additional moisture. IDEC systems typically cool air to a temperature slightly below the outdoor air wet-bulb temperature.

IDEC systems used in arid climates (with a design wet bulb temperature of 66° F. or lower) have a power consumption typically lower than a compressor-based cooling system. However, in more humid climates indirect-direct systems have less power reduction and energy savings than other cooling solutions.

Since the internal surfaces of conventional cooling towers are made from metal, in the above the evaporative cooling systems, these metal inside surfaces of the conventional cooling towers rapidly form mold, mildew, calcination and deposits of metals due to the cooling towers metal inner surface being contacted with water. These deposits of mold, mildew, calcination and metals reduce the cooling efficiency of the cooling system and reduces the useful life of the cooling system overtime since the formations of mold, mildew, calcination and metals onto the inner surface of the cooling tower reduce the effective cooling passage flow areas within the heat exchangers and form a thermal barrier layer within the cooling passages of the heat exchangers and therefore reduces the cooling efficiency of the heat exchangers and further increases the operational cost of the cooling system by having to input more electrical energy such as more power to the pumps and fans in order to run the pumps and fans at higher speeds to compensate for the reduced cooling efficiency caused by the buildup of mold, mildew, calcination and deposits of metals onto the inner surface of the cooling tower. Furthermore, very frequent maintenance and cleaning of the conventional cooling towers are required which adds very high costs to the operator of the cooling system.

Additionally, conventional cooling towers are made from a multitude of separate and individual pieces and/or plates which all have to be connected together with a multitude of separate fasteners such as screws or other fasteners or even solder or welding material. It is well known in the art that it is almost practically impossible to join pieces or plates together without having micropores which create fluid leaks due to imperfect and defective sealing and from the different parts causing thermal stresses upon each other which thermally expand at different rates which creates gaps between the fastened pieces/material and therefore causes fluid leakage as well as create cracks in the materials of the cooling tower. Also, fastening or joining a multitude of separate and individual pieces and/or plates together adds costs to the conventionally manufactured cooling tower by adding addition manufacturing steps of having to assemble all parts and/or pieces together and having to add material such as seals, soldering material and welding material in order to try to prevent fluid leakage between the joined or fastened parts. Moreover, the maintenance costs of the assembled conventional cooling towers are large because over time seals will leak and fail and therefore will need to be replaced, fasteners will fail and need replacing due to thermal cycling which induces thermal stress and the parts soldered or welded together will need to be re-soldered and re-welded because the soldered and welded joints do fail and leak over time due to thermal stress and corrosion due to being exposed to a plurality of varying conditions within an environment.

Therefore, there is an important need to provide an energy saving, efficient and low cost and maintenance method of manufacturing a cooling tower and evaporative cooling system.

The present disclosure and invention has solved the above problems of mold, mildew, calcination and deposits of metals forming on the inner surface of the cooling tower by having all inside surfaces of the cooling tower made from and/or comprise a non-porous material such as high-density polyethylene (HDPE) and not made from metal.

Also, the present disclosure and invention has solved the above problems of conventional cooling towers by manufacturing a monolithic air transfer apparatus or enclosure which prevents fluid leaks, stresses, thermal stresses and prevents gaps forming in the air transfer apparatus or enclosure because there the air transfer apparatus or enclosure is made monolithically/integrally and thus avoids having to fasten together different parts and therefore the monolithic air transfer apparatus or enclosure voids any leaking joints.

The present disclosure includes all inside surfaces of a cooling tower manufactured from and/or comprise a non-porous material such as high-density polyethylene (HDPE) which prevents the formation of mold, mildew, calcination and deposits of metals on the inner surfaces of the cooling tower and therefore increases the cooling efficiency and the operational life of the cooling tower and the evaporative cooling system as well as lowers the cost of operating the cooling tower and evaporative cooling system by reducing the consumption of power to run the pumps, fans and other system components and by eliminating frequent cleaning and maintenance. The monolithic air transfer apparatus or enclosure is adapted to have at least one heat exchanger, such as an indirect heat exchanger pad and/or evaporative heat exchanger, attached therein and/or thereto. The at least one heat exchanger is made from and/or comprise a non-porous material such as high-density polyethylene (HDPE). Therefore, all inside surfaces of the cooling tower are made from and/or comprise a non-porous material such as high-density polyethylene (HDPE) and not made from metal. Moreover, a heat exchanger can be installed on any side (all sides including the top of the apparatus) of the monolithic air transfer apparatus or enclosure.

Additionally, the present disclosure and invention includes a monolithic air transfer apparatus or enclosure that is an integral or a monolithic structure or enclosure with an integral cavity and/or other cavities (i.e. the monolithic air transfer apparatus or enclosure and the cavity and other cavities are formed and/or manufactured from a single piece of material, i.e. one piece, such that the cavity and/or cavities are formed out of the monolithic air transfer apparatus or enclosure instead of the monolithic air transfer apparatus or enclosure being formed from a plurality of parts). The monolithic air transfer apparatus or enclosure being an integral or a monolithic structure or enclosure solves the problem of preventing water and air leaks and prevents the monolithic structure or enclosure from obtaining cracks due to different material expansion rates and from "pulling apart" due to no joints such as solder, welding or other connected and assembled joints. This also reduces costs of shipping, manufacturing and installation of the air transfer apparatus and reduces the time to manufacture and install the monolithic air transfer apparatus or enclosure because a plurality of apparatus including valves, pumps and motors are pre-installed within the cavity and/or cavities prior to the site/location of installation of the monolithic air transfer apparatus or enclosure. Also, the integrated cavity and/or cavities reduces the noise heard from the pumps and motors because the cavity and/or cavities dampens the sound heard outside of the cavity and/or cavities and therefore the monolithic air transfer apparatus or enclosure with the integral cavity and/or cavities solves the problem of being able to install the monolithic air transfer apparatus or enclosure in an environment which requires little or no noise.

SUMMARY

The present disclosure includes all inside surfaces of the monolithic air transfer apparatus or enclosure manufactured from and/or comprise a non-porous material such as high-density polyethylene (HDPE) which prevents the formation of mold, mildew, calcination and deposits of metals on the inner surfaces of the monolithic air transfer apparatus or enclosure and therefore increases the cooling efficiency and the operational life of the monolithic air transfer apparatus or enclosure and the evaporative cooling system as well as lowers the cost of operating the monolithic air transfer apparatus or enclosure and evaporative cooling system by reducing the consumption of power to run the pumps, fans and other system components and by eliminating frequent cleaning and maintenance. The monolithic air transfer apparatus or enclosure is adapted to have at least one heat exchanger, such as an indirect heat exchanger pad and/or evaporative heat exchanger, attached therein and/or thereto. The at least one heat exchanger is made from and/or comprise a non-porous material such as high-density polyethylene (HDPE). Therefore, all inside surfaces of the monolithic air transfer apparatus or enclosure are made from and/or comprise a non-porous material such as high-density polyethylene (HDPE) and not made from metal. Moreover, a heat exchanger can be installed on any side (all sides including the top of the apparatus) of the monolithic air transfer apparatus or enclosure.

Additionally, the present disclosure and invention includes a monolithic air transfer apparatus or enclosure that is an integral or a monolithic structure or enclosure with an integral cavity and/or other cavities (i.e. the monolithic air transfer apparatus or enclosure and the cavity and other cavities are formed and/or manufactured from a single piece of material, i.e. one piece, such that the cavity and/or cavities are formed out of the monolithic air transfer apparatus or enclosure instead of the monolithic air transfer apparatus or enclosure being formed from a plurality of parts). The monolithic air transfer apparatus or enclosure being an integral or a monolithic structure or enclosure solves the problem of preventing water and air leaks and prevents the monolithic structure or enclosure from obtaining cracks due to different material expansion rates and from "pulling apart" due to no joints such as solder, welding or other connected and assembled joints. This also reduces costs of shipping, manufacturing and installation of the air transfer apparatus and reduces the time to manufacture and install the monolithic air transfer apparatus or enclosure because a plurality of apparatus including valves, pumps and motors are pre-installed within the cavity and/or cavities prior to the site/location of installation of the monolithic air transfer apparatus or enclosure. Also, the integrated cavity and/or cavities reduces the noise heard from the pumps and motors because the cavity and/or cavities dampens the sound heard outside of the cavity and/or cavities and therefore the monolithic air transfer apparatus or enclosure with the integral cavity and/or cavities solves the problem of being able to install the monolithic air transfer apparatus or enclosure in an environment which requires little or no noise.

The method of manufacturing the monolithic air transfer apparatus or enclosure is made by molding, injection molding, blow molding, 3-D printing, extruding and/or coating. Preferably, the method of manufacturing the monolithic air transfer apparatus or enclosure is injection molding. The air transfer apparatus or enclosure is made from and/or comprise high-density polyethylene (HDPE) in order to solve the problem of mold, mildew, calcination and deposits of metals forming on the inner surface of the cooling tower because if all inside surfaces of the cooling tower are made from and/or comprise HDPE then mold, mildew, calcination and deposits of metals including alkaline earth metals and/or other metals are prevented from forming on the inner surfaces of the cooling tower and this prevention of mold, mildew, calcination and deposits of metals increases the cooling efficiency during the operational life of the monolithic air transfer apparatus or enclosure (i.e. a cooling tower) and the evaporative cooling system.

High-density polyethylene (HDPE) or polyethylene high-density (PEHD) is a thermoplastic polymer produced from the monomer ethylene. One example of HPDE which is used is a Marine Grade HDPE such as SEABOARD™ or STAR-BOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness used on all surfaces of the cooling tower of the Marine Grade HDPE is in the range of one sixteenth of an inch to six inches or can be smaller than one sixteenth of an inch or can be larger than six inches. The above characteristics and benefits are needed and required to make the disclosed monolithic air transfer apparatus or enclosure prevent the formation of mold, mildew, calcination and deposits of metals, prevent thermal warping and increase the cooling efficiency during the operational life of the monolithic air transfer apparatus or enclosure and the evaporative cooling system.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than $0.944$ g/cm$^3$, medium density polyethylene (MDPE) having a density in the range of $0.926$ g/cm$^3$ to $0.940$ g/cm$^3$, low density polyethylene (LDPE) having a density in the range of $0.910$ g/cm$^3$ to $0.925$ g/cm$^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(1-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention can have all inside surfaces of the monolithic air transfer apparatus or enclosure being high-density polyethylenes. If desired, the surfaces of the indirect heat exchanger pads are made from and/or comprise a non-porous material such as high-density polyethylene (HDPE). Therefore, all inside surfaces of the monolithic air transfer apparatus or enclosure are made from and/or comprise a non-porous material such as high-density polyethylene (HDPE) and not made from metal.

However, polypropylenes and ionomers having the density of the range of HPDE, may be used on all inside surfaces of the monolithic air transfer apparatus or enclosure.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such a being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, molding, injection molding, blow molding, 3-D printing, and extruding.

Additionally, HDPE is corrosion resistance. HDPE resists mold, mildew and rotting, making HDPE the ideal material for being used in the monolithic air transfer apparatus or enclosure, which is exposed to water, due to the HDPE resisting mold and mildew which results in low maintenance and very low frequent cleaning of the monolithic air transfer apparatus or enclosure as compared to conventional cooling towers. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

On example of a cooling system which the monolithic air transfer apparatus or enclosure can be used is disclosed below. At least one indirect heat exchanger pad comprises a plurality of heat exchanger passages and by the use of at least one cooling tower fan, ambient hot air passes through the plurality of heat exchanger passages and a fluid from above the at least one indirect heat exchanger pad flows down and over the surfaces of the at least one indirect heat exchanger pad, including the plurality of heat exchanger passages, and makes direct contact with the ambient hot air. Therefore, the monolithic air transfer apparatus or enclosure has cooled the ambient hot air. The now cooled ambient or outside air then flows through at least one outlet of the monolithic air transfer apparatus or enclosure.

The cooling tower fan is a motorized impeller variable frequency drive (VFD) fan. Therefore, the outside air is pulled through the at least one indirect heat exchanger pad from outside of the monolithic air transfer apparatus or enclosure to inside the cooling tower. The fluid, which has now flowed through the plurality of heat exchanger passages of the at least one indirect heat exchanger pad, exits the plurality of heat exchanger passages and is collected in a bottom portion of the monolithic air transfer apparatus or enclosure. The bottom portion of the monolithic air transfer apparatus or enclosure has a slanted or curved shape which enables the collected fluid exiting the at least one indirect heat exchanger pad to flow to a middle section of the bottom portion of the monolithic air transfer apparatus or enclosure where the collected fluid flows through an opening in the middle section where this collected fluid is pumped via a circulating pump(s) to an indirect cooling heat exchanger such as a coil type of heat exchanger.

A plurality of conduit apertures is located within a bottom of a conduit, where the conduit is located above the bottom portion of the monolithic air transfer apparatus or enclosure so as to provide automatic cleaning of the monolithic air transfer apparatus or enclosure.

A dump or drain valve and a filter are fluidly connected to the opening in the middle section and is located upstream from the circulating pump or pumps in order to remove dirt or sediment from the collected fluid which has flowed through the opening in the middle section of the bottom portion of the monolithic air transfer apparatus or enclosure. The filter can be a Y-strainer type filter or any type of known filter. The type of values used can be any known type of valve.

A drain is attached to the bottom portion of the monolithic air transfer apparatus or enclosure and is in fluid connection with the collected fluid in order to remove and/or drain the collected fluid from the bottom portion of the monolithic air transfer apparatus or enclosure at any desired time.

A door panel can be located on one side and/or on a bottom of the monolithic air transfer apparatus or enclosure in order to easily access the circulating pump or pumps and/or any other apparatus.

The circulating pump(s) is/are a seal less magnetically drive pump and also is a variable frequency drive (VFD) pump. The circulating pump(s) can operate in the range of one to two amps, or more than two amps if necessary, which dramatically reduces operating costs and still meets the cooling systems load requirement. All of the inner surfaces of the fluid passages through which the collected fluid flows through the circulating pump(s) are not metal in order to solve the problem of calcium, alkaline earth metals and/or other metals forming on the surface of the fluid passages. Therefore, all of the inner surfaces of the fluid passages in the circulating pump(s) which the collected fluid flows through are made of a non-porous material such as high-density polyethylene (HDPE) because HDPE resists mold, mildew and well as prevents calcination and the formation of metal deposits. However, the circulating pump(s) can be any pump which has inner surfaces of the fluid passages in the circulating pump(s) being made of a non-porous material such as high-density polyethylene (HDPE).

Since the cooling tower fan is a variable frequency drive (VFD) fan and the circulating pump is a variable frequency drive (VFD) pump, the cooling tower fan and the circulating pump(s) can be operated in conjunction with each other and at low speeds and low amperage in order to satisfy the requirements of the cooling capacity given an outside air temperature in order to increase the monolithic air transfer apparatus or enclosure and cooling systems efficiency because operating the cooling tower fan and/or the circulating pump(s) at low speeds lowers air velocity and fluid pump flow and therefore increases the time (i.e. dwell time) the air and fluid are within the heat exchanges which increases the heat transfer effectiveness significantly while reducing the electric power to the cooling tower fan and/or the circulating pump(s).

At a top portion of the at least one indirect heat exchanger pad, a distribution apparatus is positioned above the top portion of the at least one indirect heat exchanger pad and a fluid line is fluidly connected to and pressurized by the circulating pump. The fluid line is integrally formed within the monolithic air transfer apparatus or enclosure by the manufacturing method such as injection molding and the fluid line is fluidly connected to the distribution apparatus from inside the monolithic air transfer apparatus or enclosure, so the fluid is not in direct contact with the sun and is prevented from being heated by the direct rays or other hot elements from outside of the monolithic air transfer apparatus or enclosure. The distribution apparatus can have an open bottom and a distribution plate fastened to the distribution apparatus which has a plurality of holes and the plurality of holes are arranged in a staggered arrangement or random arrangement so as to evenly allow the pressurized fluid to flow through the plurality of holes onto the outer surface of the at least one indirect heat exchanger pad. However, the distribution apparatus can have a bottom surface comprising a plurality of holes therein, which allows for not having a distribution plate, and the plurality of holes are arranged in a staggered arrangement or random arrangement so as to evenly allow the pressurized fluid to flow through the plurality of holes onto the outer surface of the at least one indirect heat exchanger pad. The distribution apparatus is in the same shape as the top portion of the at least one indirect heat exchanger pad in order to fully coat all surfaces of the at least one indirect heat exchanger pad with a fluid. Therefore, the distribution apparatus is in the general shape of a rectangle where the sides and top of the distribution apparatus form a fluid tight apparatus and the bottom of the distribution apparatus allows a fluid to pass therethrough. At least one side of the distribution apparatus has a fluid inlet for the fluid pumped via the circulating pump(s) to enter the distribution apparatus. Therefore, the top and all sides of the distribution apparatus, except for the portion of the side which has the fluid inlet, do not allow passage of a fluid (i.e. are closed to atmospheric air).

By having the fluid being introduced into the distribution apparatus under pressure (i.e. more than atmospheric pressure) by the circulating pump, as opposed to having the fluid operating under atmospheric pressure solves the problem of being able to either increase or decrease the flow rate over the outer surfaces of the at least one indirect heat exchanger pad. Furthermore, since the fluid is pressurized by the circulating pump(s), this has allowed Applicant to create hole sizes within the distribution apparatus such that the fluid level within the distribution apparatus stays at a constant level and/or maintains a level such that the outer surfaces of the at least one indirect heat exchanger pad are always fully coated or saturated during use. The holes can be round, circular or any geometric or polygon shape. The size of the holes can have a diameter of one sixteenth of an inch to four inches. However, the hole diameters can be smaller than one sixteenth of an inch or larger than four inches. If the opening of the holes is not circular in shape, then the holes opening can be one sixteenth of an inch to four inches or can be smaller than one sixteenth of an inch or larger than four inches. The holes may all have the same size or may have different sizes in order to create hole sizes within the distribution apparatus such that the fluid level within the distribution apparatus stays at a constant level and/or maintains a level such that the outer surfaces of the at least one indirect heat exchanger pad are always fully coated or saturated during use.

A fluid channel device is located on the bottom portion of the cooling tower and is integrally formed during the manufacturing process, such as injection molding, to the bottom portion of the monolithic air transfer apparatus or enclosure. The fluid channel device is positioned on the bottom portion of the monolithic air transfer apparatus or enclosure such that the opening in the middle section of the bottom portion of the cooling tower is covered by the fluid channel device. Additionally, the fluid channel device has a plurality of channels spaced along the length of the fluid channel device. The channels may have an elongated shape, a circular shape or any geometric or polygonal shape such that the collected fluid flows into the plurality of channels. The shape of the channels is designed such that the height of the channels allows the coldest lower level portion of the collected fluid to flow therethrough and is designed such that when the circulating pump is operating at maximum power and flow rate, the collected fluid flows through the plurality of channels at a flow rate such that the indirect heat exchanger pads are being maintained fully saturated (i.e. the outside surface of the indirect heat exchanger pads are not devoid of a fluid) when the monolithic air transfer apparatus or enclosure and system are operational. The height and/or shape of the channels may all be same or some channels may have the same shape and other channels may have a different shape such that when the circulating pump(s) is/are operating at maximum power and flow rate, the collected fluid flows through the plurality of channels at a flow rate such that the at least one indirect heat exchanger pad is/are being maintained fully saturated. Also, the height of the channels may all be the same or some channels may have the same height and other channels may have a different height such that when the circulating pump(s) is/are operating at maximum power and flow rate, the collected fluid flows through the plurality of channels at a flow rate such that the at least one indirect heat exchanger pad is/are being maintained fully saturated. The height of the channels is the maximum distance between the bottom portion of the monolithic air transfer apparatus or enclosure to the void of material in the fluid channel device which forms the channel.

The shape of the monolithic air transfer apparatus or enclosure can be square, rectangular, circular or any geometric or polygonal shape. The size of the monolithic air transfer apparatus or enclosure can have a length, width and height (or effective length, width and height when the length, width and height are in a non-rectilinear shape) each from one foot up to 1000 feet or can be smaller than one foot and larger than 1000 feet depending on the desired application and use. Moreover, the diameter or hydraulic diameter of the monolithic air transfer apparatus or enclosure can be from one foot up to 1000 feet or can be smaller than one foot and larger than 1000 feet depending on the desired application and use.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link", "attached" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

FIGS. 1-5 illustrate the present invention of an indirect-direct evaporative cooling (IDEC) apparatus/system including a monolithic air transfer apparatus or enclosure 200 and a method of manufacturing the monolithic air transfer apparatus or enclosure 200.

The below disclosed monolithic air transfer apparatus or enclosure 200 and cooling system uses one hundred percent fresh ambient or outside air as the air suppled to a building or space which desires cool air. However, depending on the requirement for cooling, preconditioned air may be combined with the ambient or outside air for the air to be used for cooling a building or space.

Figure 1:
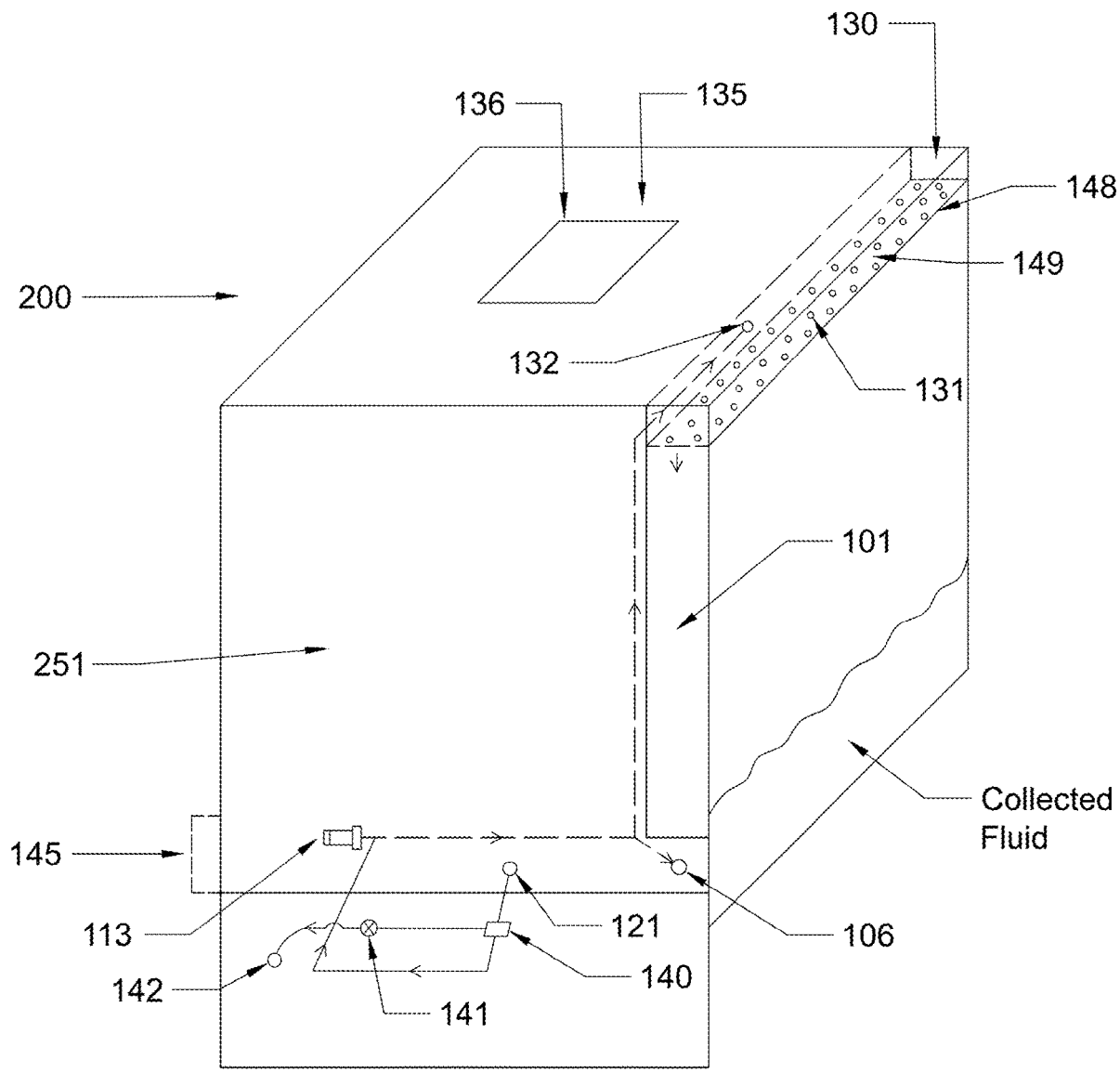
FIG. 1 is a perspective view of a monolithic air transfer apparatus or enclosure in the form of a box shape and illustrating only one side having an indirect heat exchanger pad with a distribution apparatus.

As shown in FIG. 1, the monolithic air transfer apparatus or enclosure 200 is in the general shape of a square or is box shaped having an internal cavity 251. However, the shape of the monolithic air transfer apparatus or enclosure 200 can be any geometrical or polygonal shape. The monolithic air transfer apparatus or enclosure 200 has a height in the range of two feet to one hundred feet; a width in the range of two feet to one hundred feet; and a depth in the range of two feet to one hundred feet. As needed, the above height, width and depth ranges of the monolithic air transfer apparatus or enclosure 200 may be smaller and/or larger than the above disclosed ranges in order to meet design and cooling demands. As shown in FIG. 1, the monolithic air transfer apparatus or enclosure 200 is comprised of a front side which can have an access door if needed; a top 135 which may or may not have an aperture 136 therein; a bottom portion; a back side which is opposite the front side; two sides (left and right sides); and at least one indirect heat exchanger pad 101 can be incorporated into the monolithic air transfer apparatus by integrally forming the at least one indirect heat exchanger pad 101 within the monolithic air transfer apparatus or enclosure 200 in the process of molding, injection molding, blow molding or extruding. Also, the at least one indirect heat exchanger pad 101 can be incorporated into the monolithic air transfer apparatus by attaching the at least one indirect heat exchanger pad 101 within/to the monolithic air transfer apparatus or enclosure 200. The indirect heat exchanger pad 101 can be located on at least one side (i.e. on a left side, a right side, a back side, a front side or even the top 135) of the monolithic air transfer apparatus or enclosure 200). Each indirect heat exchanger pad 101 can have the general shape of a rectangle. However, the shape of the indirect heat exchanger pads 101 can be any geometrical or polygonal shape. The indirect heat exchanger pads 101 may have a height in the range of two feet to twelve feet; a width in the range of two feet to twelve feet; and a depth in the range of two feet to twelve feet. As needed, the above height, width and depth ranges of the indirect heat exchanger pads 101 may be smaller and/or larger than the above disclosed ranges in order to meet design and cooling demands. Also, the height of the indirect heat exchanger pads 101 installed in or integrally formed from the monolithic air transfer apparatus or enclosure 200 may be in the range of one to one hundred feet.

All inside/internal surfaces of the monolithic air transfer apparatus or enclosure 200 such as the internal walls of monolithic air transfer apparatus or enclosure 200 are made from a non-porous material and/or comprising a non-porous material and not metal. Preferably, all inside surfaces of the monolithic air transfer apparatus or enclosure 200, as well as for the surfaces of the indirect heat exchanger pads, are made from and/or comprise high-density polyethylene (HDPE) in order to solve the problem of mold, mildew, calcination and deposits of metals forming on the inner surface of the cooling tower 100 because if all inside surfaces of the monolithic air transfer apparatus or enclosure 200 are made from and/or comprise HDPE then mold, mildew, calcination and deposits of metals including alkaline earth metals and/or other metals are prevented from forming on the inner surfaces of the monolithic air transfer apparatus or enclosure 200 and this prevention of mold, mildew, calcination and deposits of metals increases the cooling efficiency during the operational life of the monolithic air transfer apparatus or enclosure 200 and the evaporative cooling system. The non-porous surfaces can be made by methods of manufacturing as well as molding, injection molding, blow molding, coating or 3-D printing. The surfaces, including the heat transfer plates/cells 111 of the indirect heat exchanger pads 101 are made from and/or comprise a non-porous material such as high-density polyethylene (HDPE). Therefore, all inside surfaces of the monolithic air transfer apparatus or enclosure 200 are made from and/or comprise a non-porous material such as high-density polyethylene (HDPE) and not made from metal.

High-density polyethylene (HDPE) or polyethylene high-density (PEHD) is a thermoplastic polymer produced from the monomer ethylene. One example of HPDE which is used is a Marine Grade HDPE such as SEABOARD™ or STARBOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness used on all surfaces of the monolithic air transfer apparatus or enclosure 200 of the Marine Grade HDPE is in the range of one sixteenth of an inch to six inches. The above characteristics and benefits are needed and required to make the disclosed monolithic air transfer apparatus or enclosure 200 prevent the formation of mold, mildew, calcination and deposits of metals, prevent thermal warping and increase the cooling efficiency during the operational life of the monolithic air transfer apparatus or enclosure 200 and the evaporative cooling system.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than 0.944 g/cm$^3$, medium density polyethylene (MDPE) having a density in the range of 0.926 g/cm$^3$ to 0.940 g/cm$^3$, low density polyethylene (LDPE) having a density in the range of 0.910 g/cm$^3$ to 0.925 g/cm$^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(l-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention has on all inside surfaces of the monolithic air transfer apparatus or enclosure 200 high-density polyethylenes. However, polypropylenes and ionomers having the density of the range of HPDE may be used on all inside surfaces of the monolithic air transfer apparatus or enclosure 200.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such a being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, molding, injection molding, blow molding, 3-D printing, and extruding.

Additionally, HDPE is corrosion resistance. HDPE resists mold, mildew and rotting, making HDPE the ideal material for being used in the monolithic air transfer apparatus or enclosure 200, which is exposed to water, due to the HDPE resisting mold and mildew which results in low maintenance and less frequent cleaning of the monolithic air transfer apparatus or enclosure 200 when compared to conventional metal and porous cooling towers. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

On example of an evaporative cooling system which includes the monolithic air transfer apparatus or enclosure 200 can be used is disclosed below.

Figure 2:
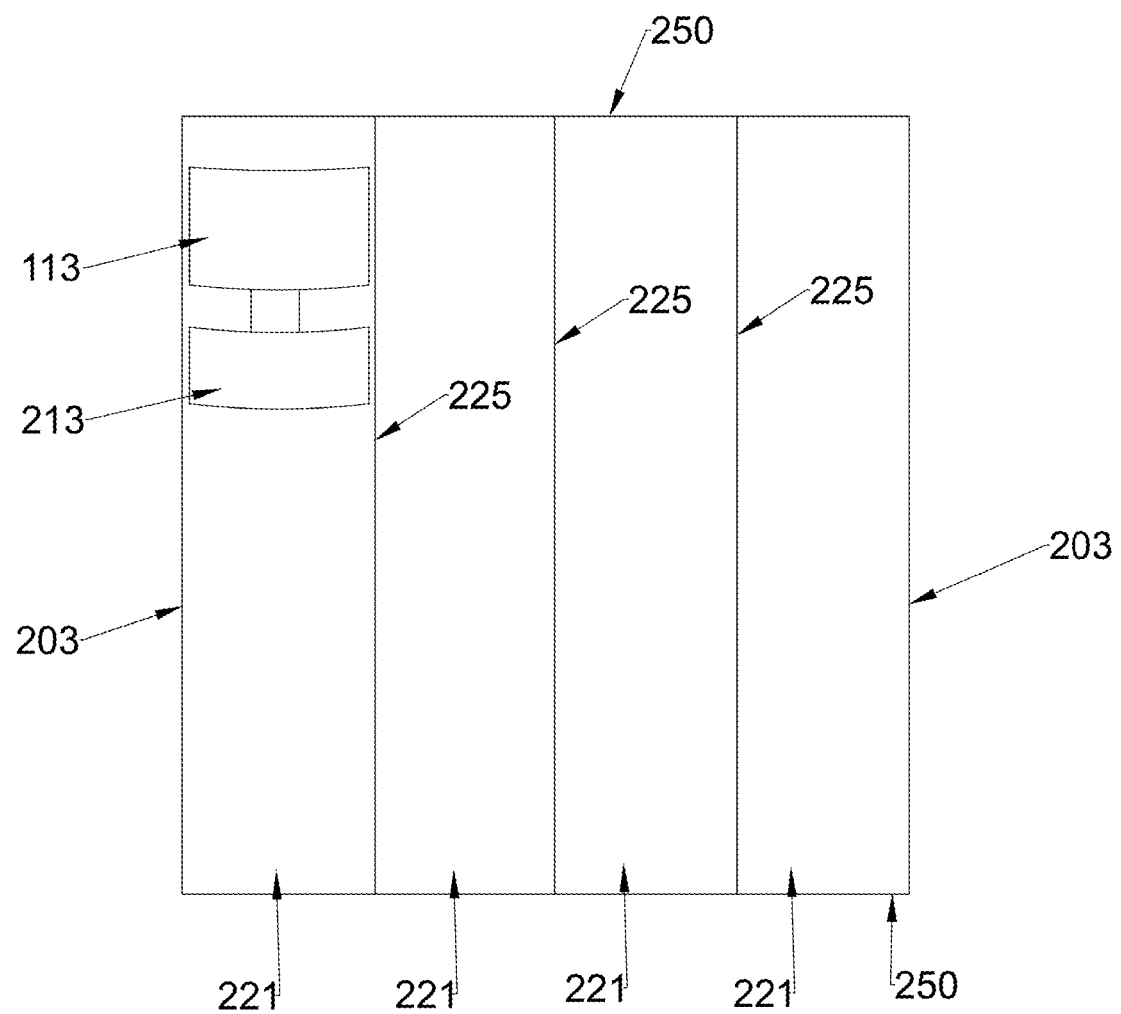
FIG. 2 illustrates a top cross-sectional view where the monolithic air transfer apparatus or enclosure has a plurality of individual dividers within an integral cavity forming a plurality of integral segmented cavity where a pump or pumps and/or a motor or motors or other apparatus can be installed in each of the individual cavities.
Figure 3:
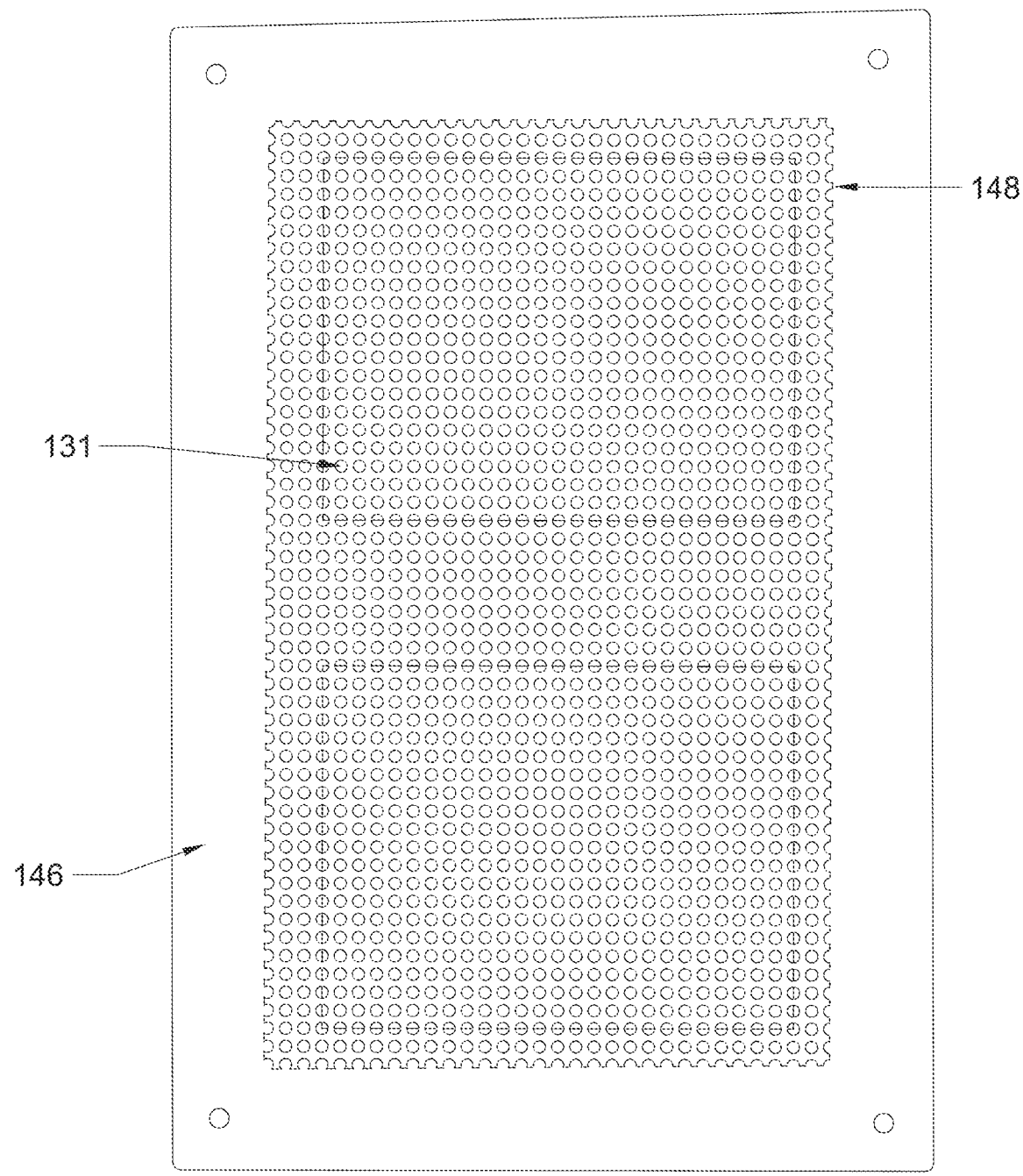
FIG. 3 is a top view of the distribution apparatus and a distribution plate within the monolithic air transfer apparatus or enclosure.
Figure 4:
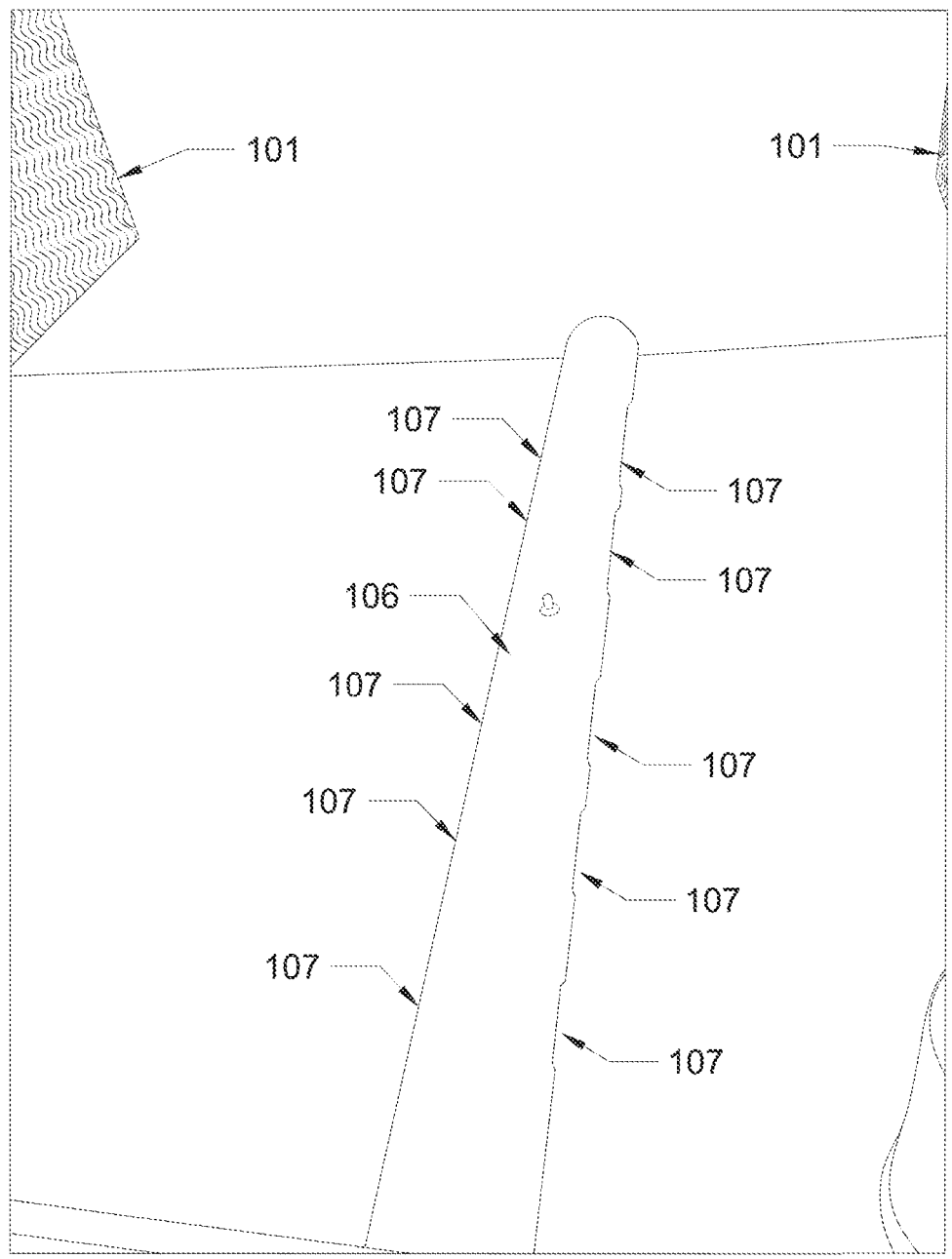
FIG. 4 is a schematic top perspective view illustrating the fluid channel device in a middle section of the bottom portion inside the monolithic air transfer apparatus or enclosure.

As shown in FIG. 1, FIG. 2, FIG. 3 and FIG. 14, ambient or outside air is forced through each of the indirect heat exchanger pads 101 via the cooling tower fan or a plurality of cooling fans and a cooling fluid such as water flows over outer surfaces of the indirect heat exchanger pads 101 which cools the hot ambient air and moist air exits the monolithic air transfer apparatus or enclosure 200 through aperture 136. The cooling tower fan is a motorized impeller variable frequency drive (VFD) fan. Therefore, the outside air is pulled through the indirect heat exchanger pads 101 from outside of the monolithic air transfer apparatus or enclosure 200 to inside the monolithic air transfer apparatus or enclosure 200. The cooling fluid, such as water flows, which has now flowed over the outer surface of the indirect heat exchanger pads 101, exits the indirect heat exchanger pads 101 via the force of gravity and is collected in a bottom portion of the monolithic air transfer apparatus or enclosure 200. As shown in FIG. 1 and FIG. 4, the bottom portion of the monolithic air transfer apparatus or enclosure 200 has a slanted or curved shape which enables the collected cooling fluid exiting the indirect heat exchanger pads 101 to flow to a middle section of the bottom portion of the monolithic air transfer apparatus or enclosure 200 where the fluid flows through channels 107 and is collected and pumped via a circulating pump 113 to a distribution apparatus 130 and/or an heat exchanger such as a heat exchanger coil.

As illustrated in FIG. 1, a dump or drain valve 141 and a filter 140 are fluidly connected in an opening in the middle section and is located upstream from the circulating pump 113 in order to remove dirt or sediment from the collected fluid which has flowed through the opening in the middle section of the bottom portion of the monolithic air transfer apparatus or enclosure 200. A drain 142 is located downstream of the dump or drain valve 141. The filter can be a Y-strainer type filter or any type of known filter. The type of value(s) used can be any known type of valve.

The circulating pump 113 is a seal less magnetically driven pump and also is a variable frequency drive (VFD) pump. The circulating pump 113 can operate in the range of one to two amps, or more than two amps if needed, which decreases operating costs and still meet the cooling systems load requirement due to using less power than conventional cooling systems. All of the inner surfaces of the fluid passages through which the collected fluid flows through the circulating pump 113 is not metal in order to solve the problem of calcium, alkaline earth metals and/or other metals forming on the surface of the fluid passages. Therefore, all of the inner surfaces of the fluid passages in the circulating pump 113 which the collected fluid flows through are made of a non-porous material such as high-density polyethylene (HDPE) because HDPE resists mold, mildew and well as prevents calcination and the formation of metal deposits. However, the circulating pumps can be any pump which has inner surfaces of the fluid passages in the circulating pump being made of a non-porous material such as high-density polyethylene (HDPE).

Since the cooling tower fan is a motorized impeller variable frequency drive (VFD) fan, the at least one cooling fan is a motorized impeller variable frequency drive (VFD) fan and the circulating pump 113 is a variable frequency drive (VFD) pump, the cooling tower fan, the at least one cooling fan and the circulating pump 113 can be operated in conjunction with each other and at low speeds and low amperage in order to satisfy the requirements of the cooling capacity given an outside air temperature in order to increase the monolithic air transfer apparatus or enclosure 200 and cooling systems efficiency because operating the cooling tower fan, and/or the at least one cooling fan and/or the circulating pump 113 at low speeds lowers air velocity and fluid pump flow and therefore increases the time (i.e. dwell time) the air and fluid are within the heat exchanges which increases the heat transfer effectiveness significantly while reducing the electric power to the cooling tower fan, the at least one cooling fan and/or the circulating pump 113.

As shown in FIG. 1, a door panel 145 is located on one side and/or on a bottom and/or on at least one of a plurality of segmented cavities of FIG. 2 of the monolithic air transfer apparatus or enclosure 200 in order to easily access the circulating pump 113 or pumps and/or any other apparatus.

As shown in FIG. 1, at a top portion of the indirect heat exchanger pads 101, a distribution apparatus 130 formed integrally with the monolithic air transfer apparatus or enclosure 200 is position above the top portion of the indirect heat exchanger pads 101 and a fluid line/channel integrally formed within the monolithic air transfer apparatus or enclosure 200 is fluidly connected to the distribution apparatus 130 and pressurized by the circulating pump 113. The fluid line/channel is fluidly connected to the distribution apparatus 130 from inside the monolithic air transfer apparatus or enclosure 200, so the fluid is not in direct contact with the sun and is prevented from being heated by the direct rays or other hot elements from outside of the monolithic air transfer apparatus or enclosure 200. As shown in FIG. 3, the distribution apparatus 130 has a plurality of holes 131 in a distribution plate 148 and the plurality of distribution holes 131 are arranged in a staggered arrangement or random arrangement so as to evenly allow the pressurized fluid to flow through the plurality of distribution holes 131 onto the outer surface of the indirect heat exchanger pads 101. The plurality of distribution holes 131 may all have the same shape and size or some distribution holes 131 have the same shape and size while other distribution holes 131 have different shapes and sizes in order to obtain a fluid level within the distribution apparatus 130 that stays at a constant level and/or maintains a level such that the outer surfaces of the indirect heat exchanger pads 101 are always fully coated or saturated during use. Further, as shown in FIG. 1, the distribution apparatus 130 has distribution apparatus inlet 132. However, the distribution apparatus 130 can have an open bottom portion 146 comprising a plurality of distribution holes 131 therein, therefore the distribution plate is not needed, and the plurality of distribution holes 131 are arranged in a staggered arrangement or random arrangement so as to evenly allow the pressurized fluid to flow through the plurality of distribution holes 131 onto the outer surface of the indirect heat exchanger pads 101.

Figure 6:
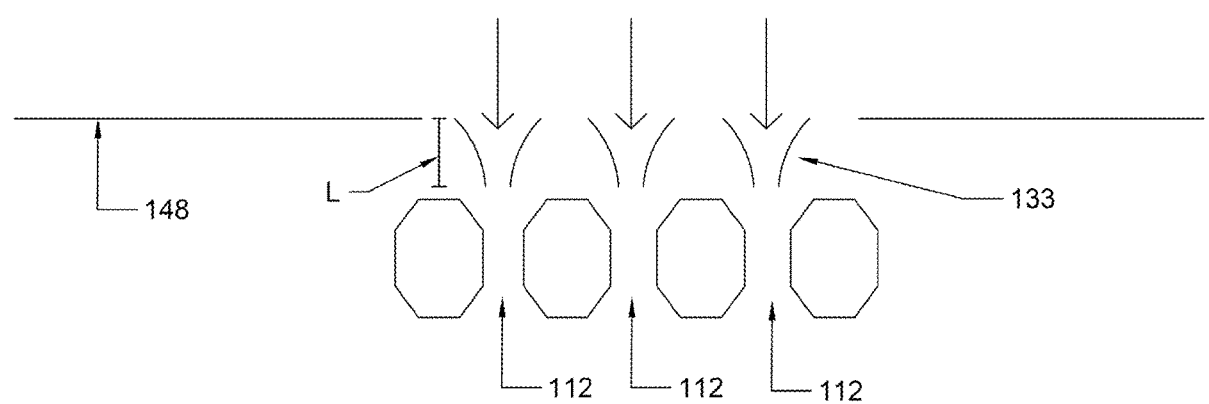
FIG. 6 is a cross sectional view of the distribution plate along with a top row of the plates/cells of the indirect heat exchanger pad.

Also, as illustrated in FIG. 6, the distribution plate 148 has nozzles 133 which have a shape so as to feed/distribute a fluid into gaps 112 between plates/cells 111 of the indirect heat exchanger pad(s) 101. The shape of the nozzles 133 can be curved, convergent nozzles, diverging-converging nozzles or other polygonal or geometric shapes. The length L of the nozzles 133 can be the same for all nozzles 133 on the distribution plate 148; the length L of the nozzles 133 can all be different on the distribution plate 148; or the length L of some nozzles 133 can be different than the length L of other nozzles 133 on the distribution plate 148 in order to always have the surfaces of the indirect heat exchanger pads 101 being fully coated or saturated during use which solves the problem of thermal warping of the heat exchanger pads 101 and increases the heat exchange efficiency of the heat exchanger pads 101 within the system. The length L of the nozzles 133 are in the range of one sixteenth of an inch to five inches. However, the length L of the nozzles 133 can be smaller than one sixteenth of an inch and can be larger than five inches.

The distribution apparatus 130 is in the same shape as the top portion of the at least one indirect heat exchanger pad 101 in order to fully coat all surfaces of the indirect heat exchanger pads 101 with a fluid. Therefore, the distribution apparatus 130 is in the general shape of a rectangle where the sides and top of the distribution apparatus 130 form a fluid tight apparatus and the bottom portion 146 of the distribution apparatus 130 allows a fluid to pass therethrough. At least one side of the distribution apparatus 130 has a fluid inlet 132 for the fluid pumped via the circulating pump(s) 113 to enter the distribution apparatus 130. Therefore, the top and all sides of the distribution apparatus 130, except for the portion of the side which has the fluid inlet 132, do not allow passage of a fluid (i.e. are closed to atmospheric air).

By having the fluid being introduced into the distribution apparatus 130 under pressure (i.e. more than atmospheric pressure) by the circulating pump 113, as opposed to having the fluid operating under atmospheric pressure solves the problem of being able to either increase or decrease the flow rate over the outer surfaces of the indirect heat exchanger pads 101. Furthermore, since the fluid is pressurized by the circulating pump(s) 113, this has allowed Applicant to create distribution hole 131 sizes within the distribution apparatus 130 such that the fluid level within the distribution apparatus 130 stays at a constant level and/or maintains a level such that the outer surfaces of the indirect heat exchanger pads 101 are always fully coated or saturated during use. The distribution holes 131 can be round, circular or any geometric or polygon shape. The size of the distribution holes 131 can have a diameter of one sixteenth of an inch to four inches. However, the distribution hole 131 diameters can be smaller and/or larger than one sixteenth of an inch or four inches. When the opening of the distribution holes 131 is not circular in shape, then the distribution holes 131 opening can be one sixteenth of an inch to four inches or can be larger or smaller than one sixteenth of an inch or four inches. The distribution holes 131 may all have the same size or may have different sizes in order to create distribution hole 131 sizes within the distribution apparatus 130 such that the fluid level within the distribution apparatus 130 stays at a constant level and/or maintains a level such that the outer surfaces of the indirect heat exchanger pads 101 are always fully coated or saturated during use.

As shown in FIG. 4, a fluid channel device 106 is located on the bottom portion of the monolithic air transfer apparatus or enclosure 200 and is integrally formed with the bottom portion of the monolithic air transfer apparatus or enclosure 200. The fluid channel device 106 is positioned on the bottom portion of the monolithic air transfer apparatus or enclosure 200 such that the opening in the middle section of the bottom portion of the monolithic air transfer apparatus or enclosure 200 is covered by the fluid channel device 106. Additionally, the fluid channel device 106 has a plurality of channels 107 spaced along the length of the fluid channel device 106. The channels 107 may have an elongated shape, a circular shape or any geometric or polygonal shape such that the collected fluid flows into the plurality of channels 107. The shape of the channels 107 is designed such that the height of the channels 107 allows the coldest lower level portion of the collected fluid to flow therethrough and is designed such that when the circulating pump 113 is operating at maximum power and flow rate, the collected fluid flows through the plurality of channels 107 at a flow rate such that the indirect heat exchanger pads 101 are being maintained fully saturated (i.e. the outside surface of the indirect heat exchanger pads 101 are not devoid of a fluid) when the monolithic air transfer apparatus or enclosure 200 and system are operational.

The walls of the monolithic air transfer apparatus or enclosure 200 may have different thicknesses so as to provide better heat resistance to the interior of the air transfer apparatus or enclosure 200. For example, one wall of the monolithic air transfer apparatus or enclosure 200 may be from one sixteenth of an inch to ten inches and is thicker than all of the other walls of the monolithic air transfer apparatus or enclosure 200.

As shown in FIG. 2, pumps 113 and motors 213 along with other apparatus such as piping, and value(s) are positioned within an integral cavity 250 or into each integral segmented cavity 221 of the monolithic air transfer apparatus or enclosure 200 having end and side walls 103. The monolithic air transfer apparatus or enclosure 200 is formed with at least one cavity and/or an integral cavity 250 (i.e. the monolithic air transfer apparatus or enclosure 200 and the integral cavity and/or each integral segmented cavity 221 are formed and/or manufactured as one piece such that the integral cavity and/or the integral segmented cavities is/are formed out of the air transfer apparatus or enclosure such as a bottom or any side of the air transfer apparatus or enclosure instead of the cavity/cavities being a separate device installed/attached onto the monolithic air transfer apparatus or enclosure 200). The integral cavity can be formed on a bottom or on any side of the monolithic air transfer apparatus or enclosure 200. The integral cavity 250 is an encapsulated space within the monolithic air transfer apparatus or enclosure 200 such that apparatus and devices such as pumps 113, motors 213, values and piping of a heat exchanger system can be positioned within the integral cavity which solves the problem of preventing leaking fluids from exiting the integral cavity since there are no joints which can leak and having to take extra installation and set-up time and added labor costs of installing associated apparatus and heat exchange devices at a job site because these associated apparatus and heat exchange devices are already pre-installed prior to the installation of the monolithic air transfer apparatus or enclosure 200 at the job site. Also, the integrated cavity 250 reduces the noise heard from the pumps 113 and motors 213 because the integrated cavity dampens the sound heard outside of the integrated cavity 250 and therefore the air transfer apparatus or enclosure 200 with the integral cavity solves the problem of being able to install the air transfer apparatus or enclosure 200 in an environment which requires little or no noise.

The distribution apparatus 130 including a distribution plate comprising holes 131, and the integrated cavity 201, as shown in FIG. 1 (i.e. the monolithic air transfer apparatus or enclosure 200 and the integral internal cavity 251 and/or other cavities are formed and/or manufactured from a single piece of material, i.e. one piece, such that the integral internal cavity 251 and/or other cavities, such as fluid flow cavities, the distribution apparatus 130 including a distribution plate comprising holes 131, and the integrated cavity 201 are formed out of the monolithic air transfer apparatus or enclosure 200 instead of the monolithic air transfer apparatus or enclosure 200 being formed from a plurality of parts). The integral or the monolithic air transfer apparatus or enclosure 200 is preferably made of HDPE and formed by the manufacturing process of molding, injection molding, blow molding, extruding. Preferably, the monolithic air transfer apparatus or enclosure is manufactured by the manufacturing process of injection molding. However, if needed, some non-integral/monolithic pipe(s) may be installed or attached to the air transfer apparatus or enclosure 200.

The HDPE, which the air transfer apparatus or enclosure 200 is made from, may include Ultraviolet (UV) protection absorbers and/or additives or compounds such as benzotriazoles, benzophenones and organic nickel compounds and any equivalent absorber, additives or compounds; and/or fire suppression/retardant/protection additives or compounds such as brominates, organophosphorus compounds, melamine based compound and metal hydroxide and any equivalent fire suppression/retardant/protection additives or compounds; and/or any antifungal and/or antibacterial and/or antimicrobial additives or compounds such as isothiazolinone compounds, zinc pyrithione, thiabendazole, and silver antimicrobial compounds and any equivalent antifungal and/or antibacterial and/or antimicrobial additives or compounds in order to protect which the air transfer apparatus or enclosure 200 from the harmful effects of UV, fire and fungal, bacterial and microbial problems which also increases the useable life of which the air transfer apparatus or enclosure 200.

Also, as shown in FIG. 2, the integrated cavity 250 includes a plurality of individual dividers 225 forming a plurality of integral segmented cavities 221 is integrally or monolithically formed (i.e. formed and/or manufactured as one piece with the air transfer apparatus or enclosure 200 such as at a bottom or any side of the air transfer apparatus or enclosure 200) with the monolithically formed air transfer apparatus or enclosure 200 where a pump(s) 113 and motor(s) 213 or other apparatus can be installed in one or each of the individual integral segmented cavities 221. The plurality of individual dividers 225 are formed in an integrated cavity forming the plurality of segmented cavities 221.

Since the plurality of individual dividers 225 are integrally or monolithically formed with the air transfer apparatus or enclosure 200 and/or in the transfer apparatus or enclosure 200, the plurality of individual dividers 225 and integral segmented cavities 221 are one monolithic structure and is made from a monolithic block of HDPE. The pump(s) 113 and motor(s) 213 are incorporated into one or each of the individual integral segmented cavities 221 so the pump(s) 113 and motor(s) 213 are embedded into the HDPE individual integral segmented cavities 221 where the pump impeller moves freely within each of the individual integral segmented cavities 221 and the motor armature and motor wiring are embedded within individual integral segmented cavities 221 or any integrally formed cavity of the air transfer apparatus or enclosure 200. Each of the integral segmented cavities 221 is encapsulated to prevent any liquid from exiting each of the integral segmented cavities 221. Since the pump 113 is a seal less magnetically driven pump 113, the pump 113 does not have any bearings to wear out or seals to leak fluid. Moreover, the impeller of the pump 113 is floating/suspended and contactless inside a sealed casing and is driven by the motors' 213 magnetic field. As the shaft of the motor 213 does not extend into the interior of the pump 113, there is no seal for the shaft and because the impeller is not fixed to the motor shaft, the impeller floats inside the pump housing. Additionally, the impeller spins, at the same speed as the motor, supported by a stationary shaft. The only moving part which touches the liquid is the impeller. Therefore, this allows the seal less magnetically driven pump 113 to be installed/encapsulated inside an integrated cavity and/or inside each of the individual integral segmented cavities 221 or at least one of the integral segmented cavities 221 because the seal less magnetically driven pump 113 does not have seals or bearings and therefore will operate without leaking fluid and without needing maintenance due to worn our bearings and faulty seals. If it is desired, the encapsulated integrated cavity and/or each of the encapsulated individual integral segmented cavities 221 may have a door or access into the encapsulated integrated cavity and/or each of the encapsulated individual integral segmented cavities 221 to be able to replace or exchange the pump 113. For example, the encapsulated integrated cavity and/or each of the encapsulated individual integral segmented cavities 221 may have a door with appendages where the appendages insert into grooves or O-ring in the encapsulated integrated cavity and/or each of the encapsulated individual integral segmented cavities 221 so that one can push and/or turn the door to open and close the door in order to access the pump(s) 113. The encapsulated integrated cavity and/or each of the encapsulated individual integral segmented cavities 221 can be made to have a size and/or diameter which is similar to the same size and/or diameter of the pump 113. The term "similar" above means there is a small tolerance between the inner surface of the encapsulated integrated cavity and the encapsulated individual integral segmented cavities 221 and the outer surface of the pump 113 in the range of one sixty-fourth of an inch to one half of an inch but the tolerance can be less than one sixty-fourth of an inch and larger than one half of an inch.

Figure 5:
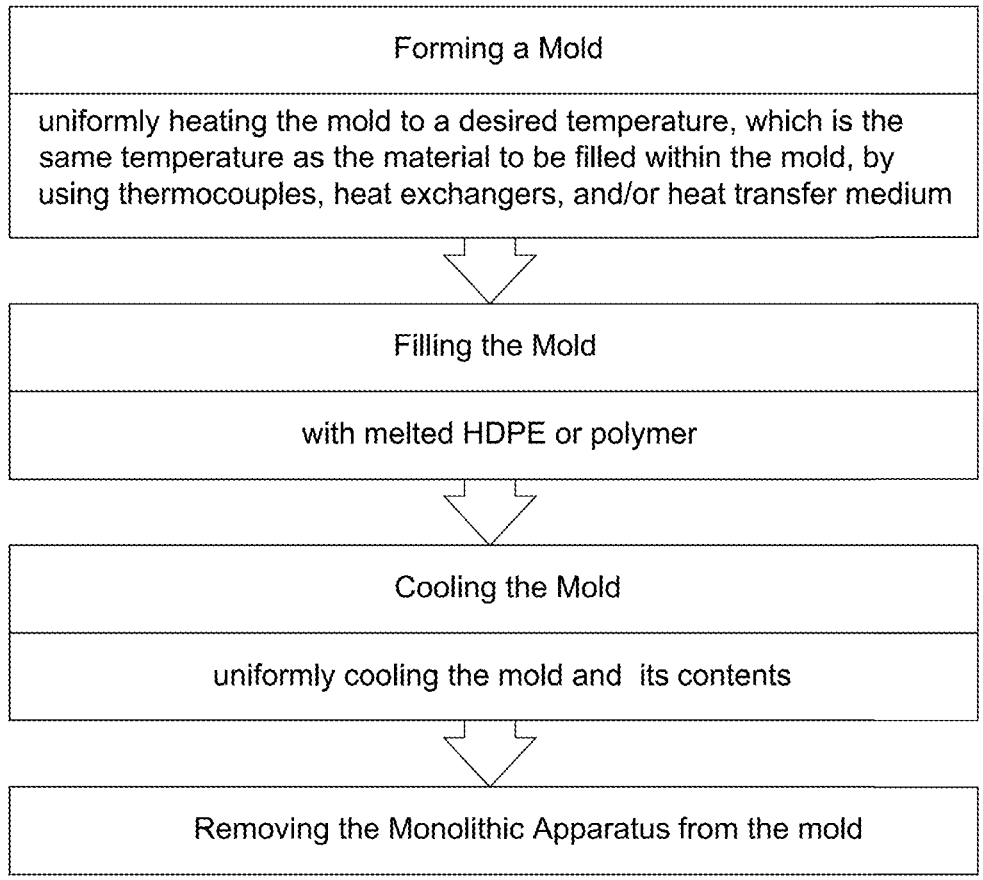
FIG. 5 is flowchart of the method of manufacturing the monolithic air transfer apparatus or enclosure.

As shown in FIG. 5, the monolithic air transfer apparatus or enclosure 200 is formed by the manufacturing process of molding and preferably injection molding where the HDPE is melted and then injected into a mold which has the shape and design of the monolithic air transfer apparatus or enclosure 200. Prior to the melted HDPE being placed into the mold, the mold is uniformly heat to a temperature which is the same temperature as the melted HDPE so that when the HDPE enters into the mold, the mold and the HDPE have the same temperature which reduces thermal stresses of the HDPE and the final molded product (i.e. the monolithic air transfer apparatus or enclosure 200). During the entire time the HDPE is inserted into the mold, the mold is kept at a constant temperature, which is the same temperature as the entering HDPE by at least one of and/or a combination of thermal couples; piezo-electric heaters, heat exchangers; and heating medium such as fluids (e.g. water), hot gases and solids placed inside and/or outside the mold. Once the HDPE fully fills the mold, after an amount of time has elapsed, the entire mold is uniformly cooled with by at least one of and/or a combination of piezo-electric coolers, heat exchangers; and cooling medium such as fluids (e.g. water), cold gases and solids placed inside and/or outside the mold. Once the molded product (i.e. the monolithic air transfer apparatus or enclosure 200) is cooled to a desired temperature, the product is removed from the mold.

Figure 7:
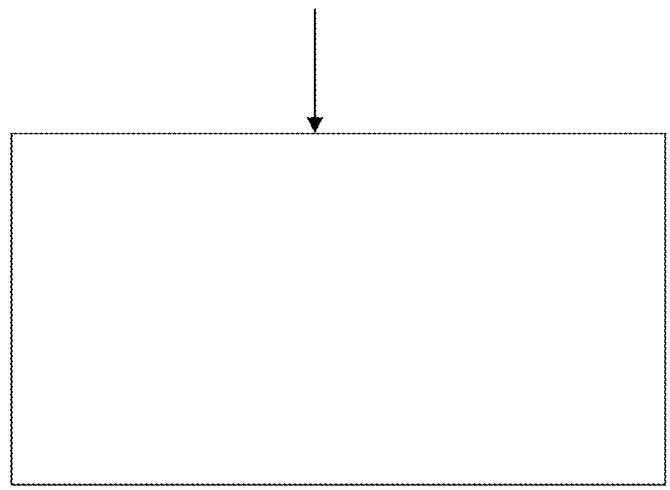
FIG. 7 illustrates an injection molding machine.

FIG. 7 illustrates an injection molding machine.

Figure 8:
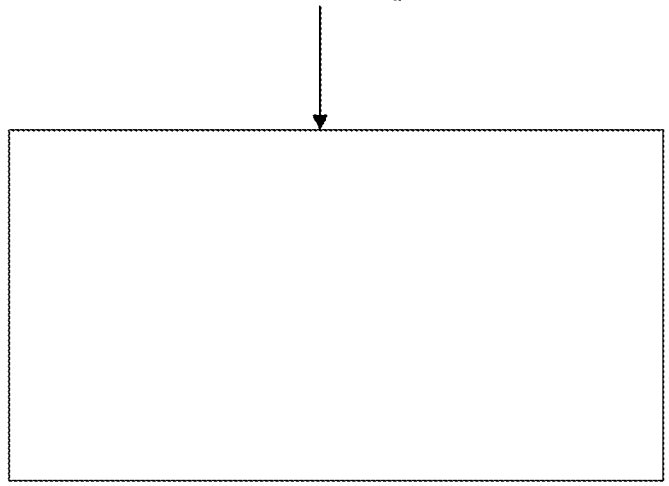
FIG. 8 illustrates a blow molding machine.

FIG. 8 illustrates a blow molding machine.

Figure 9:
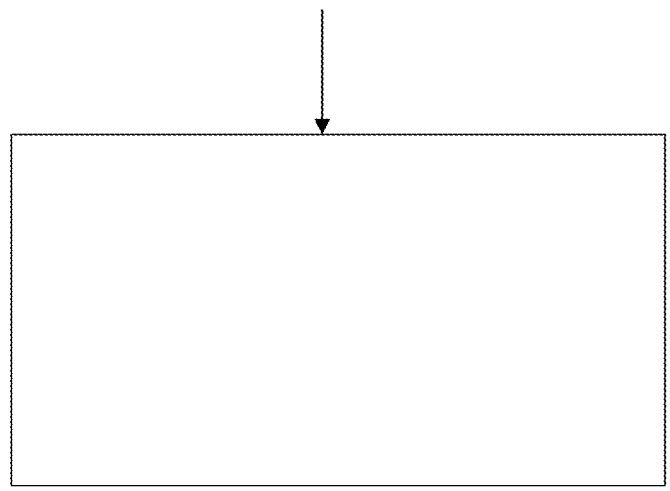
FIG. 9 illustrates an extruder.

FIG. 9 illustrates an extruder.

What is claimed is:

1. A method of manufacturing a monolithic air transfer apparatus,
    where the method comprises the steps of:
    monolithically forming a top portion which has an aperture, a bottom portion, a plurality of walls and at least one cavity of the monolithic air transfer apparatus,
    wherein the monolithically forming of the monolithic air transfer apparatus is by a process of blow molding, and incorporating at least one indirect heat exchanger pad into the monolithic air transfer apparatus.

2. The method according to claim 1, wherein the incorporating is by integrally forming the at least one indirect heat exchanger pad into the monolithic air transfer apparatus during the monolithically forming of the monolithic air transfer apparatus.

3. The method according to claim 1, wherein the monolithic air transfer apparatus is manufactured from high-density polyethylene (HDPE).

4. The method according to claim 1, wherein the monolithic air transfer apparatus and the at least one indirect heat exchanger pad are manufactured from HDPE.

5. The method according to claim 1, further comprising a step of forming a distribution apparatus into the monolithic air transfer apparatus during the monolithically forming of the monolithic air transfer apparatus.

6. The method according to claim 5, wherein the distribution apparatus is formed as a distribution plate.

7. The method according to claim 6, wherein the distribution plate is formed with a plurality of holes therein.

8. The method according to claim 7, wherein the plurality of holes are formed in a staggered arrangement or random arrangement so as to evenly allow pressurized fluid to flow through the plurality of holes onto an outer surface of the at least one indirect heat exchanger pad.

9. The method according to claim 1, wherein the bottom portion is formed with a slanted shape or a curved shape.

10. The method according to claim 1, further comprising a step of forming a channel device integrally with the bottom portion of the monolithic air transfer apparatus during the monolithically forming of the monolithic air transfer apparatus.

11. The method according to claim 10, further comprising a step of forming a plurality of channels spaced along a length of the channel device.

12. The method according to claim 11, wherein the plurality of channels are formed with one of an elongated shape or a circular shape.

* * * * *